United States Patent
Hattori et al.

(10) Patent No.: US 8,455,582 B2
(45) Date of Patent: *Jun. 4, 2013

(54) TIRE RUBBER COMPOSITION AND PNEUMATIC TIRE

(75) Inventors: Takayuki Hattori, Kobe (JP); Ai Matsuura, Kobe (JP); Michio Hirayama, Kobe (JP); Kenichi Uesaka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,147

(22) Filed: Dec. 8, 2010

(65) Prior Publication Data

US 2011/0136962 A1 Jun. 9, 2011

(30) Foreign Application Priority Data

Dec. 9, 2009 (JP) .................................. 2009-279494
Feb. 15, 2010 (JP) .................................. 2010-030500

(51) Int. Cl.
*B60C 1/00* (2006.01)
*C08K 3/36* (2006.01)

(52) U.S. Cl.
USPC ........... 524/493; 524/262; 524/492; 524/506; 528/30; 556/429

(58) Field of Classification Search
USPC ...... 524/262, 492, 493, 506; 528/30; 556/429
See application file for complete search history.

(56) References Cited

U.S. PATENT DOCUMENTS

| | | |
|---|---|---|
| 6,191,205 B1 | 2/2001 | Micouin et al. |
| 7,458,406 B2 | 12/2008 | Wada et al. |
| 2006/0099129 A1 | 5/2006 | Stenzel et al. |
| 2006/0217473 A1 | 9/2006 | Hergenrother et al. |
| 2007/0175557 A1 | 8/2007 | Puhala et al. |
| 2007/0197812 A1 | 8/2007 | Chaves et al. |
| 2007/0197813 A1* | 8/2007 | Chaves et al. ................. 556/427 |
| 2008/0194748 A1 | 8/2008 | Futamura |
| 2008/0306213 A1 | 12/2008 | Jiang et al. |
| 2009/0005481 A1* | 1/2009 | Ishida et al. .................. 524/301 |
| 2011/0136961 A1* | 6/2011 | Hattori et al. ................. 524/493 |

FOREIGN PATENT DOCUMENTS

| | | |
|---|---|---|
| EP | 1837369 A1 | 9/2007 |
| EP | 2128186 A1 | 12/2009 |
| JP | 2002-338744 A | 11/2002 |
| JP | 2003-221471 A | 8/2003 |
| JP | 2005-263998 A | 9/2005 |
| JP | 2005-534610 A | 11/2005 |
| JP | 2006-47070 A | 2/2006 |
| JP | 2006-70093 A | 3/2006 |
| JP | 2007-56205 A | 3/2007 |
| JP | 2008-31244 A | 2/2008 |
| JP | 2008231417 A * | 10/2008 |
| JP | 2009-126907 A | 6/2009 |
| JP | 2009-263420 A | 11/2009 |

OTHER PUBLICATIONS

Machine translation of JP 2008-231417 A, Oct. 2008.*
Joshi, "Low VOC Silanes for Silica Tires," Spring 2005 167th Technical Meeting of the Rubber Division, American Chemical Society, May 16-18, 2005, ISSN: 1547-1977, pp. 1-9, XP009072692.

* cited by examiner

*Primary Examiner* — Vickey Nerangis
(74) *Attorney, Agent, or Firm* — Birch, Stewart, Kolasch & Birch, LLP

(57) ABSTRACT

It is an object of the present invention to provide a tire rubber composition excellent in performances such as silica dispersibility and processability. The present invention relates to a tire rubber composition, comprising: a rubber component; silica; and a silane coupling agent, wherein the silica has a CTAB specific surface area of 180 $m^2$/g or more and a BET specific surface area of 185 $m^2$/g or more, and the silane coupling agent is a copolymer comprising units A represented by formula (1) and units B represented by formula (2), and the proportion of the units B is 1 to 70 mol % of the total molar amount of the units A and the units B.

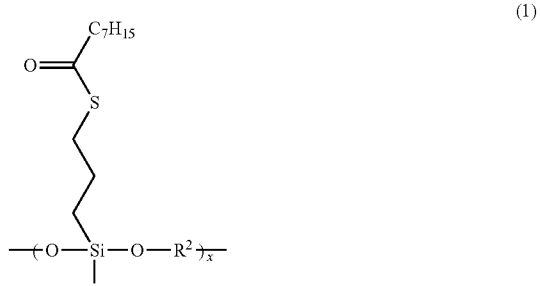

(1)

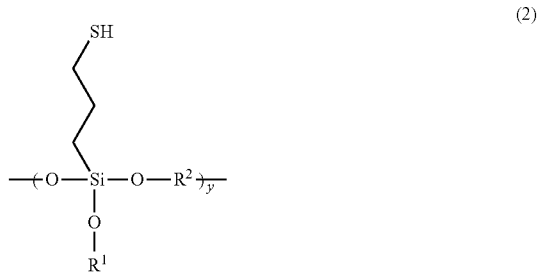

(2)

15 Claims, 1 Drawing Sheet

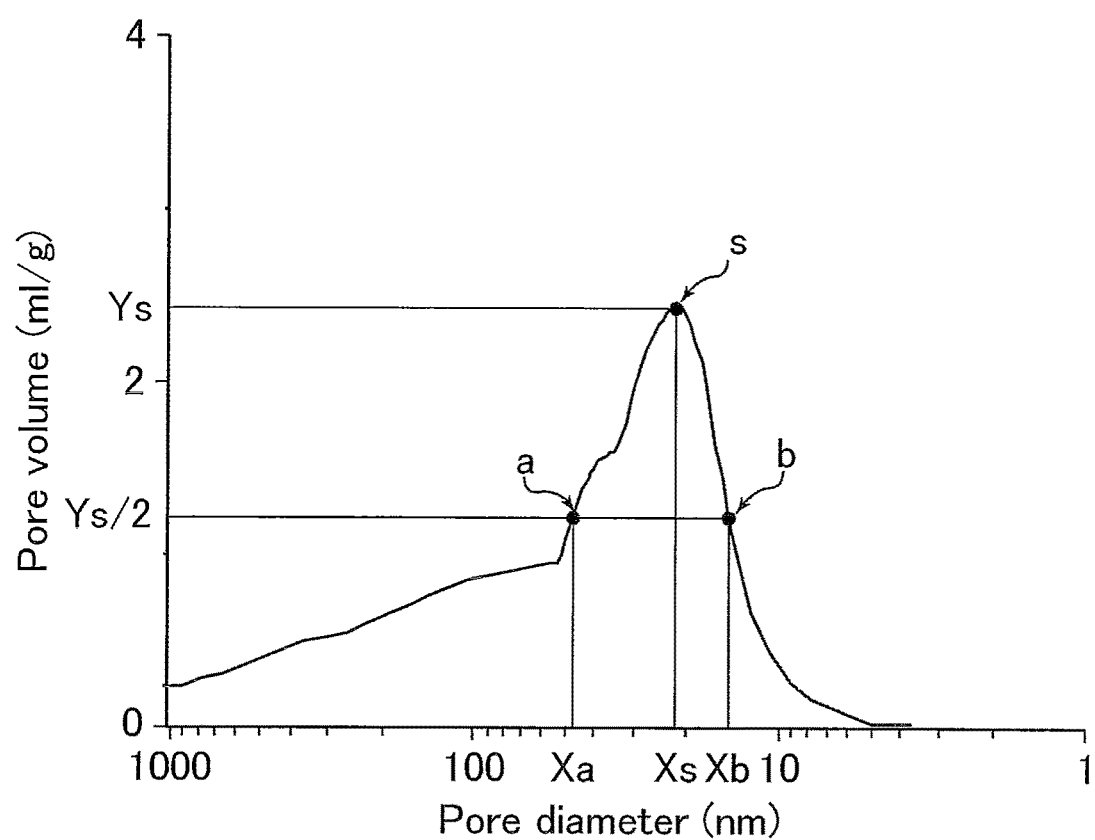

TIRE RUBBER COMPOSITION AND PNEUMATIC TIRE

TECHNICAL FIELD

The present invention relates to a tire rubber composition and a pneumatic tire produced using the rubber composition.

BACKGROUND ART

In tire rubber compositions used for treads, sidewalls, base treads, and the like, carbon black has been widely used as a filler in order to give reinforcement, but silica has been increasingly used due to the recent demand for fuel economy and concerns about exhaustion of petroleum resources. However, since silica has a hydrophilic silanol group on its surface, silica has lower affinity for rubber (in particular, natural rubber, butadiene rubber, styrene butadiene rubber, and the like rubbers often used for tires) than that of carbon black, and silica is often inferior to carbon black in abrasion resistance and mechanical strength (tensile strength, elongation at break, crack resistance, flex crack growth resistance, tear strength, and the like performances).

For example, rubber compositions containing carbon black with a rubber component that is obtained by blending natural rubber which shows excellent tensile strength and tear strength, butadiene rubber which improves flex crack growth resistance, and the like rubbers have been conventionally used for sidewalls and base treads of tires. If a large proportion of or otherwise all of the carbon black is replaced with silica, crack resistance and flex crack growth resistance problematically decrease. This is presumably because, for example, the silica dispersibility tends to be low compared with that of carbon black, and breaking energy (tensile strength×elongation at break) is less likely to be sufficiently secured. In case of a rubber composition for a tread, such problems as reduction in abrasion resistance arise when silica is used in place of carbon black.

In order to solve these problems, methods with a silane coupling agent or with finely-divided silica having a high reinforcing effect are considered. However, finely-divided silica is usually very difficult to disperse in a rubber composition. Accordingly, the silica is not well dispersed, agglomerates remain, and abrasion resistance and mechanical strength may not be much improved or may be further deteriorated.

Silane coupling agents such as bis(3-triethoxysilylpropyl) disulfide and bis(3-triethoxysilylpropyl)tetrasulfide, which are widely used in conventional tire rubber compositions, greatly improve the silica dispersibility and impart good mechanical properties to the rubber compositions. However, dispersion of finely-divided silica requires a large amount of a silane coupling agent, resulting in a great increase in cost, and good dispersion of the silica may not be obtained even if the silane coupling agent is sufficiently added. In addition, if a rubber composition is kneaded at a high temperature for sufficient reaction between finely-divided silica and such a coupling agent, the rubber composition tends to gel or scorch.

Mercapto group-containing silane coupling agents are proposed as coupling agents that are more highly reactive than the conventionally-used coupling agents. The silane coupling agents are highly reactive and thus show high performance. However, the scorch time is very short, and the silane coupling agents have difficulty in practical use in the tire industry and are hardly used now.

Patent Document 1 discloses a tire rubber composition that contains silica and improves wet grip performance without deteriorating rolling resistance and abrasion resistance. Patent Documents 2 and 3 disclose rubber compositions for a sidewall that contain silica and have good flex crack growth resistance and tear strength. However, these rubber compositions are further required to improve rolling resistance, abrasion resistance, and wet grip performance in good balance, and to improve rolling resistance, flex crack growth resistance, tear strength, and crack resistance in good balance.

Patent Document 1: JP 2008-31244 A

Patent Document 2: JP 2006-70093 A

Patent Document 3: JP 2007-56205 A

SUMMARY OF THE INVENTION

It is an object of the present invention to provide a tire rubber composition excellent in performances such as silica dispersibility and processability so as to solve the above problems. More specifically, the present invention aims to provide: a rubber composition for a tread, in which good rolling resistance is highly compatible with abrasion resistance and which excels in wet grip performance and dry grip performance; and a rubber composition for a sidewall or a base tread which improves rolling resistance, tear strength, flex crack growth resistance, and crack resistance in good balance. It is also an object of the present invention to provide a pneumatic tire produced using the rubber composition.

The present inventors have found that in a silica-containing rubber composition which tends to cause problems in abrasion resistance, crack resistance, flex crack growth resistance, and the like performances, combined use of silica having a predetermined value or more of a CTAB specific surface area and a predetermined value or more of a BET specific surface area and a specific mercapto group-containing silane coupling agent provides good dispersibility of the finely-divided silica and good scorch resistance together, leading to completion of the present invention.

The present invention relates to a tire rubber composition, comprising: a rubber component; silica; and a silane coupling agent, wherein the silica has a CTAB specific surface area of 180 m$^2$/g or more and a BET specific surface area of 185 m$^2$/g or more, and the silane coupling agent is a copolymer comprising units A represented by formula (1) and units B represented by formula (2), and the proportion of the units B is 1 to 70 mol % of the total molar amount of the units A and the units B:

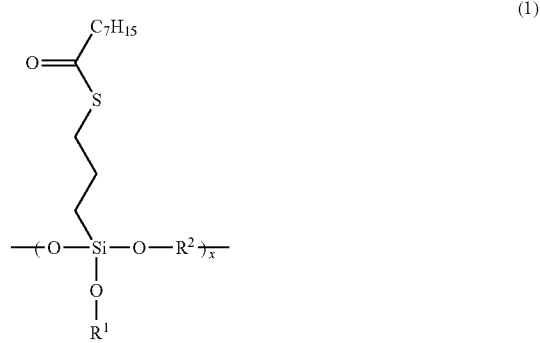

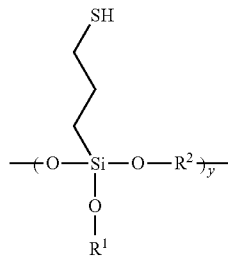

(2)

wherein x and y each are an integer of one or more, $R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group in which a hydrogen atom at the end of the alkyl or alkenyl group is replaced with a hydroxy or carboxyl group, $R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^1$ and $R^2$ may form a ring structure together.

The silica desirably has an aggregate size of 30 nm or more.

The amount of a butadiene rubber in 100% by mass of the rubber component is desirably 30% by mass or more.

The tire rubber composition is desirably used for a tread, a sidewall, or a base tread.

The present invention also relates to a pneumatic tire produced using the rubber composition.

The tire rubber composition according to the present invention comprises a rubber component, silica having a predetermined value or more of a CTAB specific surface area and a predetermined value or more of a BET specific surface area, and a specific mercapto group-containing silane coupling agent. Accordingly, the rubber composition excels in performances such as silica dispersibility and processability. Thus, if the rubber composition is used for a (cap) tread, rolling resistance and abrasion resistance are highly compatible, and excellent wet grip performance, dry grip performance, and mechanical strength are achieved. If the rubber composition is used for a sidewall or a base tread, rolling resistance, tear strength, flex crack growth resistance, and crack resistance are improved in good balance. Accordingly, if the rubber composition is used for each tire component, it is possible to provide a pneumatic tire in which these performances are achieved in good balance. The rubber composition is also excellent in processability (especially kneading processability) upon tire production.

BRIEF DESCRIPTION OF THE DRAWINGS

FIG. 1 is a view illustrating a pore distribution curve.

BEST MODE FOR CARRYING OUT THE INVENTION

The tire rubber composition of the present invention comprises a rubber component, silica having a predetermined value or more of a CTAB specific surface area and a predetermined value or more of a BET specific surface area, and a specific mercapto group-containing silane coupling agent. Since the rubber composition contains both such silica and silane coupling agent, the silica is favorably dispersed in the rubber component. Accordingly, low rolling resistance is compatible with abrasion resistance, and good mechanical strength (tear strength, flex crack growth resistance, crack resistance, and the like performances), and excellent wet grip performance, dry grip performance, and dynamic strength (breaking energy) are also achieved. The combined use of the silica and the silane coupling agent enables maintenance of an appropriate scorch time and improvement in scorch resistance. Accordingly, rubber scorch is prevented, and the processability upon tire production is favorable. Further, since low rolling resistance is compatible with mechanical strength, dynamic strength, and abrasion resistance, the rubber composition is desirable in consideration of the environment.

The rubber component used in the present invention is not particularly limited. Examples thereof include ones generally used for tire rubber compositions, such as natural rubber (NR), epoxidized natural rubber (ENR), isoprene rubber (IR), butadiene rubber (BR), modified BR, styrene butadiene rubber (SBR), styrene-isoprene-butadiene rubber (SIBR), ethylene-propylene-diene rubber (EPDM), chloroprene rubber (CR), and acrylonitrile butadiene rubber (NBR). Desirable among these are: low-polarity rubbers such as NR, BR, IR, and modified BR; SBR; ENR and the like. More desirable among these are NR and/or BR. A mercapto group-containing silane coupling agent tends to cause scorching in comparison with common silane coupling agents, and processability may be deteriorated. In response, the use of the low-polarity rubbers is likely to prevent the tendency and solves the problem, and better processability can be achieved.

The low-polarity rubber as used herein may have a glass transition temperature (Tg) of −20° C. or lower, more desirably −30° C. or lower, further desirably −40° C. or lower, and most desirably −50° C. or lower. The Tg used herein is measured with a differential scanning calorimeter (Q200) produced by TA Instruments. Japan at a temperature increase rate of 10° C./minute in conformity with JIS K7121.

Silica, particularly finely-divided silica, tends not to be uniformly dispersed in low-polarity rubbers. Accordingly, when a common silane coupling agent used for tire rubber compositions such as (bis(3-triethoxysilylpropyl)disulfide or bis(3-triethoxysilylpropyl)tetrasulfide is used, it is difficult to disperse silica uniformly in a rubber composition containing a large amount of a low-polarity rubber. In contrast, the specific mercapto group-containing coupling agent enables a comparatively good dispersion of silica in a rubber composition containing a large amount of a low-polarity rubber even in case of finely-divided silica. Thus, the present invention is particularly effective when the rubber composition contains a low-polarity rubber.

In the case where the rubber composition of the present invention contains a low-polarity rubber, the amount of the low-polarity rubber in 100% by mass of the rubber component is desirably 10% by mass or more, more desirably 25% by mass or more, and further desirably 40% by mass or more. If the amount is less than 10% by mass, processability tends to be deteriorated. The amount of the low-polarity rubber in 100% by mass of the rubber component may be 100% by mass, and is desirably 80% by mass or less and more desirably 60% by mass or less. If the amount exceeds 80% by mass, it may be difficult to impart the necessary wet grip performance to the rubber composition used for a cap tread, and it may be difficult to improve performances by using rubbers other than the low-polarity rubber when the rubber composition is used for a sidewall or a base tread.

Examples of the NR include ones generally used in the rubber industry, such as RSS#3 and TSR20.

In the case where the rubber composition of the present invention contains the NR, the amount of the NR in 100% by mass of the rubber component is desirably 5% by mass or more, more desirably 15% by mass or more, and further desirably 25% by mass or more. If the amount is less than 5% by mass, it may be difficult to achieve the necessary improvement in mechanical strength and provide wet grip performance. The amount of the NR in 100% by mass of the rubber component is desirably 60% by mass or less, and more desirably 50% by mass or less. If the amount of the NR exceeds 60% by mass, the relative proportion of other rubbers such as BR is small, and it may be difficult to impart the necessary abrasion resistance and crack resistance to the rubber composition.

Particularly in the case where the rubber composition is used for a tread, the amount of the NR in 100% by mass of the rubber component is desirably 5% by mass or more, more desirably 15% by mass or more, and further desirably 25% by mass or more. The amount of the NR in 100% by mass of the rubber component is desirably 60% by mass or less, and more desirably 50% by mass or less. If the amount is less than the lower limit or exceeds the upper limit, the same tendency as mentioned above with respect to the amount of the NR is shown.

In the case where the rubber composition is used for a sidewall and a base tread, the amount of the NR in 100% by mass of the rubber component is desirably 5% by mass or more, more desirably 15% by mass or more, further desirably 25% by mass or more, and particularly desirably 35% by mass or more. The amount of the NR in 100% by mass of the rubber component is desirably 85% by mass or less, more desirably 75% by mass or less, further desirably 65% by mass or less, and particularly desirably 50% by mass or less. If the amount is less than the lower limit or exceeds the upper limit, the same tendency as mentioned above with respect to the amount of the NR is shown.

The BR desirably has a cis content of 80% by mass or more. Such BR enables better abrasion resistance. The cis content is more desirably 85% by mass or more, further desirably 90% by mass or more, and most desirably 95% by mass or more.

Further, the BR desirably has a viscosity of 40 cps or more in the form of a 5% solution in toluene at 25° C. Such BR can greatly improve processability and abrasion resistance. The viscosity of the BR solution in toluene is desirably 200 cps or less. If the viscosity exceeds 200 cps, the viscosity tends to be excessively high and deteriorate processability, and the BR is less likely to be mixed with other rubbers. The lower limit of the viscosity of the BR solution in toluene is more desirably 80 cps, and further desirably 110 cps. The upper limit thereof is more desirably 150 cps.

BR having a molecular weight distribution (Mw/Mn) of 3.0 or less may be used in order to improve abrasion resistance. In addition, BR having an Mw/Mn of 3.0 to 3.4 may be used in order to simultaneously improve both processability and abrasion resistance.

The BR is desirably synthesized from a biomass-derived material in order to reduce environmental load. Such BR may be produced, for example, by a method including reacting a catalyst with bioethanol to produce butadiene and synthesizing BR from the butadiene as a raw material. Although such BR synthesized from a biomass-derived material may be blended as a part of the BR component, the BR component in the rubber composition particularly desirably contains 100% by mass of biomass-derived BR. The biomass-derived material means a "renewable organic resource of biological origin except fossil resources". Whether the material is biomass-derived may be checked by the method of determining the amount of $^{14}C$ (ASTM-D6866).

In the case where the rubber composition of the present invention contains the BR, the amount of the BR in 100% by mass of the rubber component is desirably 30% by mass or more, more desirably 40% by mass or more, and further desirably 50% by mass or more. If the amount is less than 30% by mass, it may be difficult to impart the necessary abrasion resistance and crack resistance to the rubber composition. The amount of the BR in 100% by mass of the rubber component is desirably 95% by mass or less, more desirably 85% by mass or less, and further desirably 75% by mass or less. If the amount of the BR exceeds 95% by mass, the relative proportion of other rubbers such as NR is small, and it may be difficult to achieve the necessary improvement in mechanical strength and provide wet grip performance.

Particularly in the case where the rubber composition is used for a tread, the amount of the BR in 100% by mass of the rubber component is desirably 5% by mass or more, more desirably 15% by mass or more, further desirably 25% by mass or more, and particularly desirably 50% by mass or more. The amount of the BR in 100% by mass of the rubber component is desirably 85% by mass or less, more desirably 75% by mass or less, and further desirably 65% by mass or less. If the amount is less than the lower limit or exceeds the upper limit, the same tendency as mentioned above with respect to the amount of the BR is shown.

In the case where the rubber composition is used for a sidewall and a base tread, the amount of the BR in 100% by mass of the rubber component is desirably 30% by mass or more, more desirably 40% by mass or more, and further desirably 50% by mass or more. The amount of the BR in 100% by mass of the rubber component is desirably 95% by mass or less, more desirably 85% by mass or less, and further desirably 75% by mass or less. If the amount is less than the lower limit or exceeds the upper limit, the same tendency as mentioned above with respect to the amount of the BR is shown.

If the amount of BR is large, silica tends to be poorly dispersed and tear strength and breaking energy tend to be deteriorated while crack resistance and rolling resistance tend to be favorable. In the present invention, however, even if the amount of the BR is large, silica is favorably dispersed.

Examples of the SBR include emulsion-polymerized styrene butadiene rubber (E-SBR) and solution-polymerized styrene butadiene rubber (S-SBR).

The styrene content of the SBR is desirably 5% by mass or more, more desirably 15% by mass or more, and further desirably 20% by mass or more. If the styrene content is less than 5% by mass, sufficient grip performance may not be achieved if the rubber composition is used for a cap tread. The styrene content is desirably 60% by mass or less, more desirably 45% by mass or less, and further desirably 30% by mass or less. If the styrene content exceeds 60% by mass, the compatibility with the low-polarity rubber may decrease, hardness may increase excessively, and abrasion resistance may be deteriorated.

In the case where the rubber composition of the present invention contains the SBR, the amount of the SBR in 100% by mass of the rubber component is desirably 10% by mass or more, more desirably 25% by mass or more, and further desirably 40% by mass or more. If the amount is less than 10% by mass, sufficient grip performance may not be achieved if the rubber composition is used for a cap tread. The amount of the SBR in 100% by mass of the rubber component may be 100% by mass, and is desirably 80% by mass or less, and more desirably 60% by mass or less. If the amount exceeds 80% by mass, the relative proportion of the low-polarity rubber is small, and abrasion resistance and scorch resistance may be problematic.

The present invention contains silica having a CTAB specific surface area of 180 m$^2$/g or more and a BET specific surface area of 185 m$^2$/g or more (hereinafter, also referred to as "finely-divided silica"). If such finely-divided silica is favorably dispersed in rubber, excellent abrasion resistance, mechanical strength (tear strength, flex crack growth resistance, crack resistance, and the like performances), wet grip performance, and dry grip performance are achieved, and rolling resistance is reduced.

The CTAB (cetyltrimethylammonium bromide) specific surface area of the finely-divided silica is desirably 190 m$^2$/g or more, more desirably 195 m$^2$/g or more, and further desirably 197 m$^2$/g or more. If the CTAB specific surface area is less than 180 m$^2$/g, mechanical strength and abrasion resistance tend not to be sufficiently improved. The CTAB specific surface area is desirably 600 m$^2$/g or less, more desirably 300 m$^2$/g or less, and further desirably 250 m$^2$/g or less. If the CTAB specific surface area exceeds 600 m$^2$/g, the silica may agglomerate due to the inferior dispersibility, and therefore physical properties tend to be deteriorated.

The CTAB specific surface area is measured in conformity with ASTM D3765-92.

The BET specific surface area of the finely-divided silica is desirably 190 m$^2$/g or more, more desirably 195 m$^2$/g or more, and further desirably 210 m$^2$/g or more. If the BET specific surface area is less than 185 m$^2$/g, mechanical strength and abrasion resistance tend not to be sufficiently improved. The BET specific surface area is desirably 600 m$^2$/g or less, more desirably 300 m$^2$/g or less, and further desirably 260 m$^2$/g or less. If the BET specific surface area exceeds 600 m$^2$/g, the silica may agglomerate due to the inferior dispersibility, and therefore physical properties tend to be deteriorated.

The BET specific surface area of the silica is measured in conformity with ASTM D3037-81.

The aggregate size of the finely-divided silica is 30 nm or more, desirably 35 nm or more, more desirably 40 nm or more, further desirably 45 nm or more, particularly desirably 50 nm or more, more particularly desirably 55 nm or more, and most desirably 60 nm or more. The aggregate size thereof is desirably 100 nm or less, more desirably 80 nm or less, further desirably 70 nm or less, and particularly desirably 65 nm or less. If the finely-divided silica has an aggregate size in such a range, the finely-divided silica is favorably dispersed while excellent reinforcement and favorable breaking energy are achieved. In addition, good abrasion resistance, tear strength, flex crack growth resistance, and crack resistance can be achieved.

The aggregate size is also called an aggregate diameter or a maximum frequency Stokes equivalent diameter, and means a particle size in the case where a silica aggregate formed by aggregation of a plurality of primary particles is regarded as one particle. The aggregate size may be measured with a disk centrifugal sedimentation granulometric analysis apparatus such as BI-XDC (produced by Brookhaven Instruments Corporation), for instance.

More specifically, the aggregate size may be measured with BI-XDC by the following method.

3.2 g of silica and 40 mL of deionized water are added to a 50-mL tall beaker, and the beaker containing a silica suspension is placed into a crystallizer filled with ice. In the beaker, the suspension is deagglomerated with an ultrasonic probe (1500-W 1.9-cm VIBRACELL ultrasonic probe (produced by Bioblock, used at 60% of the maximum power output)) for 8 minutes to prepare a sample. 15 mL of the sample is introduced into a disk, stirred, and measured under the conditions of a fixed mode, an analysis time of 120 minutes, and a density of 2.1.

In the apparatus recorder, the values of the diameters passing at 16% by mass, 50% by mass (or median) and 84% by mass and the value of the Mode are recorded (the derivative of the cumulative granulometric curve gives a frequency curve, the abscissa of the maximum of which is known as the "Mode").

By the disk centrifugal sedimentation granulometric analysis method, an average size (by mass) of the particles (i.e. aggregates), marked $D_w$, can be measured after the silica is dispersed in water by ultrasonic deagglomeration. After analysis (sedimentation for 120 minutes), the particle size distribution by mass is calculated by the granulometric analysis apparatus. The average size (by mass) of the particles, marked $D_w$, is calculated by the following equation:

$$\log D_w = \sum_1^n m_i \log D_i \Big/ \sum_1^n m_i$$

(In the formula, $m_i$ is the total mass of the particles in the class of $D_i$).

The average primary particle size of the finely-divided silica is desirably 25 nm or less, more desirably 22 nm or less, further desirably 17 nm or less, and particularly desirably 14 nm or less. The lower limit of the average primary particle size is not particularly limited, and is desirably 3 nm or more, more desirably 5 nm or more, and further desirably 7 nm or more. The finely-divided silica having such a small average primary particle size has the aforementioned aggregate size, and therefore a structure like that of carbon black. Accordingly, the silica dispersibility is more improved, which further improves reinforcement, abrasion resistance, tear strength, flex crack growth resistance, and crack resistance.

The average primary particle size of the finely-divided silica may be determined by observing the silica with a transmission or scanning electron microscope, measuring the sizes of 400 or more primary particles of the silica observed in the visual field, and averaging the sizes of the 400 or more primary particles.

The D50 of the finely-divided silica is desirably 7.0 μm or less, more desirably 5.5 μm or less, and further desirably 4.5 μm or less. If the D50 exceeds 7.0 μm, the silica is actually more poorly dispersed. The D50 of the finely-divided silica is desirably 2.0 μm or more, more desirably 2.5 μm or more, and further desirably 3.0 μm or more. If the D50 is less than 2.0 μm, the aggregate size also tends to be small, and the finely-divided silica is less likely to be sufficiently dispersed.

The D50 as used herein is a median diameter of the finely-divided silica than which 50% by mass of the particles are smaller.

In the finely-divided silica, the proportion of the finely-divided silica whose particle size is larger than 18 μm is desirably 6% by mass or less, more desirably 4% by mass or less, and further desirably 1.5% by mass or less. Thereby, the silica is favorably dispersed, and desired performances are achieved.

The D50 of the finely-divided silica and the proportion of the silica having a specific particle size are determined by the following method.

The aggregation of aggregates is estimated by granulometric measurement (by laser diffraction) carried out on a silica suspension previously deagglomerated by ultrasonication. In this method, the aptitude of the silica for deagglomeration is measured (deagglomeration of the silica particles of 0.1 to tens of microns). The ultrasonic deagglomeration was performed with a VIBRACELL sound wave generator (600 W, produced by Bioblock, used at 80% of the maximum power output) equipped with a probe having a diameter of 19 mm. The granulometric measurement is carried out by laser diffraction on a MALVERN Mastersizer 2000 granulometric analyzer.

More specifically, the measurement is carried out by the following method.

1 g of silica is weighed in a pill box (6 cm in height and 4 cm in diameter), deionized water is added thereto to give a mass of 50 g, and thereby an aqueous suspension containing 2% of silica (this suspension is homogenized by magnetic stirring for 2 minutes) is prepared. Subsequently, ultrasonic deagglomeration is performed for 420 seconds, all the homogenized suspension is introduced into the vessel of the granulometric analyzer, and thereafter granulometric measurement is performed.

The distribution width W of the pore volume of the finely-divided silica is desirably 0.7 or more, more desirably 1.0 or more, further desirably 1.3 or more, and particularly desirably 1.5 or more. The pore distribution width W is desirably 5.0 or less, more desirably 4.0 or less, further desirably 3.0 or less, and particularly desirably 2.0 or less. Such broad pore distribution leads to improvement in silica dispersibility and provides desired performances.

The distribution width W of the pore volume of the silica may be measured by the following method.

The pore volume of the finely-divided silica is measured by mercury porosimetry. A silica sample is pre-dried in an oven at 200° C. for 2 hours. Subsequently, within five minutes after the sample is removed from the oven, the sample is put in a test receptacle, and degassed under vacuum. The pore diameter (AUTOPORE III 9420, porosimeter for powder technology) is calculated by Washburn's equation with a contact angle of 140° and a surface tension γ of 484 dynes/cm (or N/m).

The pore distribution width W may be determined from a pore distribution curve as in FIG. 1 shown by the function of pore diameter (nm) and pore volume (mL/g). More specifically, the diameter Xs (nm) that gives the peak value Ys (mL/g) of the pore volume is recorded, the straight line of Y=Ys/2 is drawn, and then the points a and b at which the straight line intersects the pore distribution curve are obtained. When the abscissas (nm) of the points a and b are Xa and Xb (Xa>Xb), respectively, the pore distribution width W is equivalent to (Xa−Xb)/Xs.

The diameter Xs (nm) that gives the peak value Ys of the pore volume in the pore distribution curve of the finely-divided silica is desirably 10 nm or more, more desirably 15 nm or more, further desirably 18 nm or more, and particularly desirably 20 nm or more. The diameter Xs is desirably 60 nm or less, more desirably 35 nm or less, further desirably 28 nm or less, and particularly desirably 25 nm or less. The diameter Xs in such a range can provide finely-divided silica excellent in dispersibility and reinforcement.

In the rubber composition of the present invention, the amount of the finely-divided silica is desirably 5 parts by mass or more, more desirably 10 parts by mass or more, further desirably 15 parts by mass or more, and particularly desirably 20 parts by mass or more, per 100 parts by mass of the rubber component. If the amount is less than 5 parts by mass, sufficient reinforcement, mechanical strength, and abrasion resistance tend not to be achieved. The amount of the finely-divided silica is desirably 150 parts by mass or less, more desirably 100 parts by mass or less, and further desirably 80 parts by mass or less, per 100 parts by mass of the rubber component. If the amount exceeds 150 parts by mass, processability may be deteriorated, and good dispersibility is less likely to be secured.

Particularly in the case where the rubber composition is used for a tread, the amount of the finely-divided silica is desirably 20 parts by mass or more, more desirably 40 parts by mass or more, and further desirably 50 parts by mass or more, per 100 parts by mass of the rubber component. The amount of the finely-divided silica is desirably 120 parts by mass or less, more desirably 95 parts by mass or less, and further desirably 75 parts by mass or less, per 100 parts by mass of the rubber component. If the amount is less than the lower limit or exceeds the upper limit, the same tendency as mentioned above with respect to the amount of the finely-divided silica is shown.

In the case where the rubber composition is used for a sidewall and a base tread, the amount of the finely-divided silica is desirably 10 parts by mass or more, more desirably 20 parts by mass or more, and further desirably 25 parts by mass or more, per 100 parts by mass of the rubber component. The amount of the finely-divided silica is desirably 80 parts by mass or less, more desirably 50 parts by mass or less, and further desirably 40 parts by mass or less, per 100 parts by mass of the rubber component. If the amount is less than the lower limit or exceeds the upper limit, the same tendency as mentioned above with respect to the amount of the finely-divided silica is shown.

The rubber composition of the present invention may contain silica other than the finely-divided silica. In this case, the total amount of silica is desirably 15 parts by mass or more, more desirably 25 parts by mass or more, and further desirably 45 parts by mass or more, per 100 parts by mass of the rubber component. The total amount is desirably 200 parts by mass or less, more desirably 150 parts by mass or less, and further desirably 100 parts by mass or less, per 100 parts by mass of the rubber component. If the amount is less than the lower limit or exceeds the upper limit, the same tendency as mentioned above with respect to the amount of the finely-divided silica is shown.

The rubber composition of the present invention contains a specific mercapto group-containing silane coupling agent. If finely-divided silica is used in combination with a mercapto group-containing silane coupling agent in a silica-containing rubber composition which tends to cause problems in silica dispersibility, abrasion resistance, tear strength, flex crack growth resistance, crack resistance, and the like performances, the finely-divided silica tends to retard the vulcanization speed. Therefore, although the mercapto group-containing silane coupling agent is used, an appropriate scorch time is ensured, and good processability is achieved. In addition, such combined use enables uniform dispersion of the finely-divided silica with high reinforcement in the rubber. Accordingly, excellent reinforcement and breaking energy, and good fuel economy, abrasion resistance, tear strength, flex crack growth resistance, and crack resistance can be achieved.

Suitably used as the specific mercapto group-containing silane coupling agent is a silane coupling agent that is a copolymer comprising units A represented by formula (1) and units B represented by formula (2), in which the proportion of the units B is 1 to 70 mol % of the total molar amount of the units A and the units B:

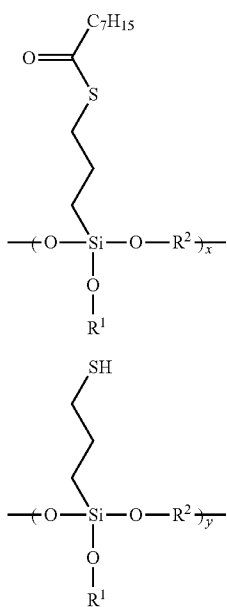

(1)

(2)

wherein x and y each are an integer of one or more, $R^1$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group in which a hydrogen atom at the end of the alkyl or alkenyl group is replaced with a hydroxy or carboxyl group, $R^2$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^1$ and $R^2$ may form a ring structure together.

A mercapto group-containing silane coupling agent is highly reactive, and highly improves the silica dispersibility. However, the silane coupling agent has drawbacks in that scorch time is short, and the rubber composition is very likely to scorch upon finishing kneading and extrusion. Accordingly, it has been difficult to use the mercapto group-containing silane coupling agent in a rubber composition that contains SBR which is more likely to scorch than low-polarity rubbers such as NR and BR.

In recent years, the modulus and hardness need to be increased in order to simultaneously achieve both lower rolling resistance and good handling stability, and the amount of a vulcanization accelerator is often increased in order to prevent change in hardness after use for long years. In this case, however, a mercapto group-containing silane coupling agent, which is highly reactive, causes a rubber composition to be more likely to scorch, and is therefore much less likely to be used.

In contrast, in the silane coupling agent having the above structure, the molar ratio of the unit A and the unit B satisfies the aforementioned condition. Thus, such a silane coupling agent suppresses an increase in viscosity upon processing in comparison with polysulfide silanes such as bis-(3-triethoxysilylpropyl)tetrasulfide. This is presumably for the following reason. Since the sulfide portion of the unit A is a C—S—C bond, the sulfide portion is thermally stable compared with tetrasulfide or disulfide. Accordingly, an increase in Mooney viscosity is small.

In the case where the molar ratio of the unit A and the unit B satisfies the condition, the silane coupling agent suppresses a reduction in scorch time in comparison with mercaptosilanes such as 3-mercaptopropyltrimethoxysilane. This is presumably for the following reason. The unit B has a mercaptosilane structure, and the —SH group of the unit B is covered with the —$C_7H_{15}$ portion of the unit A. Accordingly, the —SH group is less likely to react with polymers. Thereby, scorch time is less likely to be reduced, and viscosity is less likely to increase.

In the case where the finely-divided silica, which retards vulcanization, is used in combination with the silane coupling agent having the above structure, the scorch resistance with industrial applicability is securable even in a rubber composition that contains SBR which is more likely to scorch than low-polarity rubbers such as NR and BR and also in a rubber composition that contains a comparatively large amount of a vulcanization accelerator. With such effects, good dispersibility of finely-divided silica is presumably compatible with processability such as scorch resistance.

Examples of the halogen for $R^1$ include chlorine, bromine, and fluorine.

Examples of the branched or unbranched $C_{1-30}$ alkyl group for $R^1$ and $R^2$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The number of carbons of the alkyl group is desirably 1 to 12.

Examples of the branched or unbranched $C_{1-30}$ alkylene group for $R^1$ and $R^2$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The number of carbons of the alkylene group is desirably 1 to 12.

Examples of the branched or unbranched $C_{2-30}$ alkenyl group for $R^1$ and $R^2$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The number of carbons of the alkenyl group is desirably 2 to 12.

Examples of the branched or unbranched $C_{2-30}$ alkenylene group for $R^1$ and $R^2$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The number of carbons of the alkenylene group is desirably 2 to 12.

Examples of the branched or unbranched $C_{2-30}$ alkynyl group for $R^1$ and $R^2$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The number of carbons of the alkynyl group is desirably 2 to 12.

Examples of the branched or unbranched $C_{2-30}$ alkynylene group for $R^1$ and $R^2$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The number of carbons of the alkynylene group is desirably 2 to 12.

In the silane coupling agent having the above structure, the total number of repetition (x+y) of the number of repetition (x) of the unit A and the number of repetition (y) of the unit B is desirably 3 to 300. If the total number is within such a range, the —$C_7H_{15}$ of the unit A covers the mercaptosilane of the unit B. Accordingly, the reduction in scorch time can be suppressed, and simultaneously, good reactivity with silica and a rubber component can be secured.

Examples of the silane coupling agent having the above structure include NXT-Z30, NXT-Z45, and NXT-Z60, all produced by Momentive Performance Materials. These may be used alone, or two or more kinds thereof may be used in combination.

The amount of the mercapto group-containing silane coupling agent is desirably 0.5 parts by mass or more, more desirably 1.5 parts by mass or more, and further desirably 2.5 parts by mass or more, per 100 parts by mass of the finely-divided silica. If the amount is less than 0.5 parts by mass, the finely-divided silica is less likely to be favorably dispersed. The amount is desirably 20 parts by mass or less, more desirably 15 parts by mass or less, and further desirably 10 parts by mass or less, per 100 parts by mass of the finely-divided silica. If the amount exceeds 20 parts by mass, the dispersion of the finely-divided silica tends not to be improved according to the added amount, and the cost tends to increase unnecessarily. In addition, scorch time tends to be reduced, and processability in kneading and extrusion tends to be deteriorated.

The rubber composition of the present invention may contain a mixture of a zinc salt of an aliphatic carboxylic acid and a zinc salt of an aromatic carboxylic acid (such as Activator 73A produced by Struktol Company). In addition, the rubber composition may contain a zinc salt of a $C_{4-16}$ (desirably $C_{6-14}$, more desirably $C_{6-12}$, and further desirably $C_{6-10}$) aliphatic carboxylic acid (such as Struktol ZEH produced by Struktol Company (zinc 2-ethylhexanoate)).

These ingredients retard vulcanization, improve scorch time which may be too short when a mercapto group-containing silane coupling agent is used, and also improve the silica dispersibility. In addition, these ingredients improve the resistance to reversion of a rubber component, simultaneously achieve both excellent handling stability and wet grip performance, as well as favorable rolling resistance. The use of these ingredients reduces excess sulfur and sulfur crosslinking in an unfavorable form, provides an effective and stable crosslinking point, and provides a rubber composition with rigidity required for handling stability. These ingredients also provide a rubber composition with flexibility under the conditions of low temperatures, which relate to wet grip performance, and small distortion required for grip performance. Accordingly, these ingredients provide a tread rubber with high grip especially under wet conditions. These ingredients also provide a tread rubber that has favorable rolling resistance and abrasion resistance owing to small amounts of excess sulfur and sulfur crosslinking in an unfavorable form, and is excellent in durability so that performances do not change so much during use. In addition, these ingredients provide a sidewall rubber and a base tread rubber which are excellent in rolling resistance and durability.

Examples of the aliphatic carboxylic acid in the zinc salt of an aliphatic carboxylic acid in the mixture include aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; and aliphatic carboxylic acids chemically synthesized from petroleum or the like. Desirable are aliphatic carboxylic acids derived from vegetable oils, and more desirable are aliphatic carboxylic acids derived from coconut oil, palm kernel oil or palm oil, because it is possible to be environment-friendly, to prepare for a future decrease in oil supply, and to inhibit reversion sufficiently.

In the mixture, the number of carbons in the aliphatic carboxylic acid is desirably 4 or more, and more desirably 6 or more. If the number of carbons in the aliphatic carboxylic acid is less than 4, the dispersibility tends to decrease. The number of carbons in the aliphatic carboxylic acid is desirably 16 or less, more desirably 14 or less, and further desirably 12 or less. If the number of carbons in the aliphatic carboxylic acid exceeds 16, reversion tends not to be sufficiently inhibited.

Here, the aliphatic group in the aliphatic carboxylic acid may be one having a chain structure such as an alkyl group or one having a ring structure such as a cycloalkyl group.

Examples of the aromatic carboxylic acid in the zinc salt of an aromatic carboxylic acid in the mixture include benzoic acid, phthalic acid, mellitic acid, hemimellitic acid, trimellitic acid, diphenic acid, toluic acid, and naphthoic acid. Among these, benzoic acid, phthalic acid, or naphthoic acid is desirable because it is possible to inhibit reversion sufficiently.

The content ratio between the zinc salt of an aliphatic carboxylic acid and the zinc salt of an aromatic carboxylic acid in the mixture (molar ratio: (zinc salt of aliphatic carboxylic acid)/(zinc salt of aromatic carboxylic acid), hereinafter referred to as the "content ratio") is desirably 1/20 or more, more desirably 1/15 or more, and further desirably 1/10 or more. If the content ratio is less than 1/20, it may be impossible to be environment-friendly and to prepare for a future decrease in oil supply, and the dispersibility and stability of the mixture tend to be deteriorated. Also, the content ratio is desirably 20/1 or less, more desirably 15/1 or less, and further desirably 10/1 or less. If the content ratio is more than 20/1, reversion tends not to be sufficiently inhibited.

The zinc content in the mixture is desirably 3% by mass or more, and more desirably 5% by mass or more. If the zinc content in the mixture is less than 3% by mass, reversion tends not to be sufficiently inhibited. Also, the zinc content in the mixture is desirably 30% by mass or less, and more desirably 25% by mass or less. If the zinc content in the mixture exceeds 30% by mass, processability tends to decrease and the cost tends to unnecessarily increase.

The aliphatic carboxylic acid in the zinc salt of a $C_{4-16}$ aliphatic carboxylic acid may be either linear or branched, and may be one with a ring structure such as a cycloalkyl group. The aliphatic carboxylic acid may be either a saturated fatty acid or unsaturated fatty acid. The aliphatic carboxylic acid may be an aliphatic polycarboxylic acid such as an aliphatic dicarboxylic acid or aliphatic tricarboxylic acid.

Examples of the aliphatic carboxylic acid in the zinc salt of a $C_{4-16}$ aliphatic carboxylic acid include: saturated fatty acids such as butanoic acid, pentanoic acid, hexanoic acid, heptanoic acid, octanoic acid, nonanoic acid, decanoic acid, undecanoic acid, dodecanoic acid, isobutyric acid, isopentanoic acid, pivalic acid, isohexanoic acid, isoheptanoic acid, isooctanoic acid, dimethyloctanoic acid, isononanoic acid, isodecanoic acid, isoundecanoic acid, isododecanoic acid, 2-ethylbutyric acid, 2-ethylhexanoic acid, 2-butyloctanoic acid, succinic acid, glutaric acid, adipic acid, pimelic acid, suberic acid, and sebacic acid; and unsaturated fatty acids such as butenoic acid, pentenoic acid, hexenoic acid, heptenoic acid, octenoic acid, nonenoic acid, decenoic acid, undecenoic acid, and dodecenoic acid. Particularly desirable among these is 2-ethylhexanoic acid because it highly inhibits reversion, and is industrially rich and inexpensive. These may be used alone, or two or more kinds thereof may be used in combination.

The total amount of the mixture and the zinc salt of a $C_{4-16}$ aliphatic carboxylic acid is desirably 0.2 parts by mass or more, more desirably 0.5 parts by mass or more, and further desirably 1 part by mass or more, per 100 parts by mass of the rubber component. If the total amount is less than 0.2 parts by mass, sufficient reversion resistance and effect of improving crosslink density may not be secured, and thereby it tends to be difficult to reduce rolling resistance, and to improve handling stability, and the like. The total amount is desirably 10 parts by mass or less, more desirably 7 parts by mass or less, and further desirably 5 parts by mass or less, per 100 parts by mass of the rubber component. If the total amount exceeds 10 parts by mass, blooming may occur, and improvement of the effects by the added amount may become smaller, resulting in an unnecessary increase in cost.

The rubber composition of the present invention may contain fatty acids such as stearic acid, palmitic acid, myristic acid, lauric acid, caprylic acid, oleic acid, and linolic acid. Among these, stearic acid is desirable because of its low cost.

The rubber composition may optionally contain compounding ingredients generally used in the rubber industry, in addition to the aforementioned ingredients. Examples of the compounding ingredients include fillers such as carbon black, oils or plasticizers, antioxidants, age resistors, zinc oxide, vulcanizing agents such as sulfur and sulfur-containing compounds, and vulcanization accelerators.

The rubber composition of the present invention desirably contains carbon black. Examples of the usable carbon black include, but not particularly limited to, GPF, FEF, HAF, ISAF, and SAF. If the rubber composition contains carbon black, reinforcement can be improved, and also weather resistance, crack resistance, and the like performances can be improved. Conductivity may be improved if necessary.

The nitrogen adsorption specific surface area ($N_2SA$) of the carbon black is desirably 20 $m^2/g$ or more, more desirably 35 $m^2/g$ or more, further desirably 70 $m^2/g$ or more, particularly desirably 100 $m^2/g$ or more, and most desirably 125 $m^2/g$ or more. If the $N_2SA$ is less than 20 $m^2/g$, sufficient reinforcement and conductivity are less likely to be achieved. The $N_2SA$ of the carbon black is desirably 1400 $m^2/g$ or less, and more desirably 200 $m^2/g$ or less. If the $N_2SA$ is more than 1400 $m^2/g$, the carbon black is less likely to be favorably dispersed.

The $N_2SA$ of the carbon black is determined in accordance with the A method of JIS K6217.

In the case where the rubber composition contains the carbon black, the amount of the carbon black is desirably 1 part by mass or more, and more desirably 3 parts by mass or more, per 100 parts by mass of the rubber component. If the amount is less than 1 part by mass, the aforementioned weather resistance, crack resistance, reinforcement, and the like performances are less likely to be improved. The amount of the carbon black is desirably 100 parts by mass or less, more desirably 80 parts by mass or less, further desirably 40 parts by mass or less, particularly desirably 20 parts by mass or less, and most desirably 10 parts by mass or less, per 100 parts by mass of the rubber component. If the amount exceeds 100 parts by mass, the dispersibility and processability tend to be deteriorated, and hardness tends to increase excessively.

The rubber composition of the present invention is produced by a usual method. More specifically, the rubber composition is produced, for example, by a method including kneading the aforementioned ingredients with a kneading apparatus such as a Banbury mixer, a kneader, or an open roll mill, and then vulcanizing the resultant mixture.

The rubber kneading desirably includes: base kneading in which ingredients other than a vulcanizing agent and a vulcanization accelerator are kneaded; and finishing kneading in which a kneaded mass formed through the base kneading, a vulcanizing agent, and a vulcanization accelerator are kneaded.

In the base kneading, the rubber composition having a kneading start temperature of 10 to 100° C. is desirably kneaded to a temperature (outlet temperature of the rubber composition from a kneading apparatus) of desirably 130° C. or higher, more desirably 140° C. or higher, further desirably 150° C. or higher, particularly desirably 155° C. or higher, and most desirably 160° C. or higher. If the outlet temperature is lower than 130° C., the silane coupling agent may not sufficiently react, the silica dispersibility may be deteriorated, and the desired effects may not be achieved. The outlet temperature of the rubber composition from the kneading apparatus is desirably 200° C. or lower, more desirably 180° C. or lower, and further desirably 175° C. or lower. If the outlet temperature exceeds 200° C., the rubber composition may be degraded.

The outlet temperature of the rubber composition from the kneading apparatus in the base kneading is usually 130 to 155° C. In the case where a rubber composition that contains a polysulfide silane such as bis-(3-triethoxysilylpropyl)tetrasulfide or a common silane having a mercapto group (for example, the below-mentioned silane coupling agent 3 in EXAMPLES) is kneaded, scorch time is very short and rubber scorch occurs if the outlet temperature of the rubber composition is increased. On the other hand, the rubber composition of the present invention contains both a specific finely-divided silica and a mercapto group-containing silane coupling agent with a specific structure. Accordingly, even if the outlet temperature of the rubber composition is increased, the reduction in scorch time can be suppressed, the mechanical strength, abrasion resistance, tear strength, flex crack growth resistance, and crack resistance of the rubber composition can be improved, and the rolling resistance can be reduced.

The rubber composition of the present invention may be used for each tire component, and is desirably used especially for tire components that may contain silica and that require excellent dynamic strength (breaking energy), abrasion resistance, tear strength, flex crack growth resistance, and crack resistance. Examples of such tire components include a tread (a cap tread and a base tread), a clinch, a sidewall, and a bead apex. Examples of desirable tire components include a cap tread, a clinch, a sidewall, and a base tread. Examples of particularly desirable tire components include a cap tread, a base tread, and a sidewall.

The pneumatic tire of the present invention is produced by a common method with the above rubber composition.

More specifically, an unvulcanized rubber composition containing the aforementioned ingredients is extruded and processed into a shape of a tire component such as a tread, a sidewall, or a base tread, and then molded with other tire components in a usual manner on a tire building machine to form an unvulcanized tire. Then, the unvulcanized tire is heated and pressurized in a vulcanizer to produce a tire.

The application of the pneumatic tire produced using the rubber composition of the present invention is not particularly limited, and the pneumatic tire may be suitably used as tires for passenger vehicles, tires for trucks and buses, and the like tires. The pneumatic tire may also be suitably used as high performance tires (very low-profile tires, racing tires, and the like tires).

EXAMPLES

The present invention is more specifically described based on examples, and the present invention is not limited to these examples.

In the following, the respective chemical agents used in Examples and Comparative Examples are listed.

SBR: NIPOL NS116 produced by Zeon Corporation (solution-polymerized SBR terminally modified with N-methylpyrrolidone, styrene content: 21% by mass, Tg: −25° C.)

BR: BR150B produced by Ube Industries, Ltd. (cis content: 97% by mass, $ML_{1+4}$ (100° C.): 40, viscosity of 5% solution in toluene at 25° C.: 48 cps, Mw/Mn: 3.3, Tg: −104° C.)

NR: RSS#3 (Tg: −60° C.)

Silica 1: Zeosil 1115 MP produced by Rhodia (CTAB specific surface area: 105 m²/g, BET specific surface area: 115 m²/g, average primary particle size: 25 nm, aggregate size: 92 nm, pore distribution width W: 0.63, diameter Xs that gives pore volume peak in pore distribution curve: 60.3 nm)

Silica 2: Zeosil HRS 1200 MP produced by Rhodia (CTAB specific surface area: 195 m²/g, BET specific surface area: 200 m²/g, average primary particle size: 15 nm, aggregate size: 40 nm, D50: 6.5 μm, proportion of particles exceeding 18 μm in size: 5.0% by mass, pore distribution width W: 0.40, diameter Xs that gives pore volume peak in pore distribution curve: 18.8 nm)

Silica 3: Zeosil Premium 200 MP produced by Rhodia (CTAB specific surface area: 200 m²/g, BET specific surface area: 220 m²/g, average primary particle size: 10 nm, aggregate size: 65 nm, D50: 4.2 μm, proportion of particles exceeding 18 μm in size: 1.0% by mass, pore distribution width W: 1.57, diameter Xs that gives pore volume peak in pore distribution curve: 21.9 nm)

Carbon black: SHOBLACK N110 produced by Cabot Japan K.K. ($N_2SA$: 130 m²/g)

Silane coupling agent 1: Si69 produced by Degussa AG (bis(3-triethoxysilylpropyl)tetrasulfide)

Silane coupling agent 2: NXT-Z45 produced by Momentive Performance Materials (copolymer of unit A and unit B (unit A: 55 mol %, unit B: 45 mol %))

Silane coupling agent 3: Si363 produced by Degussa AG (content of mercapto group: 3.3%)

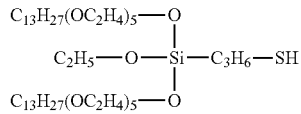

Mineral oil: PS-32 produced by Idemitsu Kosan Co., Ltd. (paraffinic process oil)

Stearic acid: "KIRI" produced by NOF Corporation

Anti-reversion agent (mixture of zinc salt of aliphatic carboxylic acid and zinc salt of aromatic carboxylic acid): Activator 73A produced by Struktol Company ((i) zinc salt of aliphatic carboxylic acid: zinc salt of fatty acid ($C_{8-12}$) derived from coconut oil, (ii) zinc salt of aromatic carboxylic acid:zinc benzoate, content molar ratio: 1/1, zinc content: 17% by mass)

Zinc oxide: Zinc oxide #2 produced by Mitsui Mining & Smelting Co., Ltd.

Age resistor: Nocrac 6C produced by Ouchi Shinko Chemical Industrial Co., Ltd. (N-(1,3-dimethylbutyl)-N'-phenyl-p-phenylenediamine)

Wax: Sunnoc Wax produced by Ouchi Shinko Chemical Industrial Co., Ltd.

Sulfur: sulfur powder produced by Tsurumi Chemical industry Co., Ltd.

Vulcanization accelerator TBBS: Nocceler NS produced by Ouchi Shinko Chemical Industrial Co., Ltd. (N-tert-butyl-2-benzothiazolylsulfenamide)

Vulcanization accelerator DPG: Nocceler D produced by Ouchi Shinko Chemical Industrial Co., Ltd. (N,N'-diphenylguanidine)

The silicas 2 and 3 among the silicas 1 to 3 are finely-divided silicas according to the present invention. The silane coupling agents 2 and 3 among the silane coupling agents 1 to 3 are mercapto group-containing silane coupling agents, and the silane coupling agent 2 is a specific mercapto group-containing silane coupling agent according to the present invention.

Examples 1 to 15 and Comparative Examples 1 to 21

The chemical agents in amounts shown in Process 1 in Tables 1 to 4 were kneaded with a Banbury mixer for 5 minutes to raise the temperature to the outlet temperature shown in Tables 1 to 4. Thereafter, the sulfur and the vulcanization accelerator(s) in amounts shown in Process 2 were kneaded into the kneaded mass formed in Process 1 with an open roll mill at about 80° C. for 3 minutes, whereby an unvulcanized rubber composition was produced.

Then, the unvulcanized rubber composition was press-vulcanized at 170° C. for 15 minutes to provide a vulcanized rubber sheet and a vulcanized rubber test piece.

With respect to the formulations of Tables 1 to 3, each resulting unvulcanized rubber composition was molded into a tread shape, assembled with other tire components, and vulcanized at 170° C. for 15 minutes to provide a test tire.

With respect to the formulations of Table 4, each resulting unvulcanized rubber composition was molded into a sidewall shape and a base tread shape, assembled with other tire components, and vulcanized at 170° C. for 15 minutes to provide a test tire.

The produced unvulcanized rubber compositions, vulcanized rubber sheets, vulcanized rubber test pieces, and test tires were evaluated as follows. Tables 1 to 4 show the test results.

Comparative Example 1 is the criterion comparative example of Example 1 and Comparative Examples 1 and 2, Comparative Example 3 is the criterion comparative example of Examples 2 and 3 and Comparative Examples 3 to 5, Comparative Example 6 is the criterion comparative example of Examples 4 to 8 and Comparative Examples 6 to 12, and Comparative Example 13 is the criterion comparative example of Examples 9 to 15 and Comparative Examples 13 to 21.

(1) Breaking Energy Index

The tensile strength and elongation at break of each vulcanized rubber sheet were measured in accordance with JIS K6251 "Rubber, vulcanized or thermoplastic—Determination of tensile stress-strain properties". Then, the breaking energy was calculated by the formula: [(tensile strength)× (elongation at break)/2], and the breaking energy index was calculated by the following formula. The larger the breaking energy index is, the better the dynamic strength is.

(Breaking energy index)=(Breaking energy of each formulation)/(Breaking energy of criterion comparative example)×100

(2) Abrasion Resistance Test (Abrasion Test)

The produced test tires were mounted on a vehicle, and the decrease in the depth of tire grooves was measured after the vehicle had run 8000 km in a city area. Then, the running distance that decreased the depth of tire grooves by 1 mm was calculated. The abrasion resistance index of the criterion comparative example was regarded as 100, and the decrease in the depth of the tire grooves of each formulation was expressed as an index by the following equation. The larger the abrasion resistance index is, the better the abrasion resistance is.

(Abrasion resistance index)=(Running distance that decreased tire groove depth by 1 mm in each formulation)/(Running distance that decreased tire groove depth by 1 mm in criterion comparative example)×100

(3) Scorch Time

According to JIS K6300, a Mooney scorch test was performed by the physical testing method of unvulcanized rubber, and t10 [minutes] at 130.0±0.5° C. was measured. The t10 was expressed as an index (Mooney scorch time index) relative to that of the criterion comparative example regarded as 100. If scorch time is short, problematically, rubber scorch tends to occur. In this evaluation, if the index is 70 or less, the problem of rubber scorch may occur in processes such as finishing kneading and extrusion.

(4) Rolling Resistance Test

A vulcanized rubber sheet (2 mm×130 mm×130 mm) was produced, and a test piece for measurement was cut out from the vulcanized rubber sheet. Then, the tan δ of each test piece was determined with a viscoelasticity spectrometer VES (produced by Iwamoto Seisakusho Co., Ltd.) under the following conditions: a temperature of 50° C.; an initial strain of 10%; a dynamic strain of 2%; and a frequency of 10 Hz. The rolling resistance index of the criterion comparative example was regarded as 100, and the rolling resistance of each formulation was expressed as an index by the following equation. The smaller the rolling resistance index is, the smaller and better the rolling resistance is.

(Rolling resistance index)=[(Tan δ of each formulation)/(Tan δ of criterion comparative example)]×100

(5) Silica Dispersion Index

A vulcanized rubber sheet (2 mm×130 mm×130 mm) was produced, and a test piece for measurement was cut out from the vulcanized rubber sheet. In conformity with JIS K6812 "Method for the assessment of the degree of pigment or carbon black dispersion in polyolefin pipes, fittings and compounds", the number of silica agglomerates in each test piece was counted, and the dispersion ratio (%) thereof was calculated. The dispersion ratio of the criterion comparative example was regarded as 100, and the silica dispersion ratio of each formulation was expressed as an index by the following equation. The larger the silica dispersion index is, the more favorably the silica is dispersed, and the better the silica dispersibility is.

(Silica dispersion index)=[(Dispersion ratio of each formulation)/(Dispersion ratio of criterion comparative example)]×100

(6) Wet Grip Performance

The wet grip performance was evaluated based on a braking performance obtained by the Anti-Lock Brake System (ABS) evaluation test. That is, the above-mentioned test tires were mounted on a 1800-cc class passenger vehicle equipped with an ABS, an actual vehicle running test was performed on an asphalt road surface (wet road surface state, skid number: about 50), and the deceleration was calculated which was a distance required for the vehicle to stop after the brakes were applied at 100 km/h on the wet asphalt road surface. The wet grip performance index of the criterion comparative example was regarded as 100, and the deceleration of each formulation was expressed as a wet grip performance index by the following equation. The larger the wet grip performance index is, the better the braking performance is, and the better the wet grip performance is.

(Wet grip performance index)=(Deceleration of criterion comparative example)/(Deceleration of each formulation)×100

(7) Dry Grip Performance

The test tires were mounted on a passenger vehicle, an actual vehicle running test was performed on a dry asphalt road surface in a test course, and performances such as handling responsiveness, rigidity, and grip were evaluated based on a sensory evaluation by a driver. The performance result of each formulation was expressed as an index (dry grip performance index) relative to that of the criterion comparative example regarded as 100. The larger the index value is, the better the dry grip performance and handling stability are.

(8) Tear Test

In conformity with JIS K6252 "Rubber, vulcanized or thermoplastic—Determination of tear strength", the tear strength (N/mm) was determined with an unnicked angle test piece (vulcanized rubber sheet). The tear strength of the criterion comparative example was regarded as 100, and the tear strength index was calculated by the following equation. The larger the tear strength index is, the higher and better the tear strength is.

(Tear strength index)=(Tear strength of each formulation)/(Tear strength of criterion comparative example)×100

(9) Test of Flex Crack Growth (De Mattia)

In conformity with JIS K6260 "Testing method of flex cracking and crack growth for rubber, vulcanized or thermoplastic (De Mattia)", the crack length of each vulcanized rubber test piece sample after 1 million test cycles or the number of test cycles until a crack had grown 1 mm in each sample was measured under the conditions of: a temperature of 23° C. and a relative humidity of 55%. Based on the obtained number of test cycles and crack length, the number of flexing cycles until a crack had grown 1 mm in each sample was expressed as the common logarithm, the common logarithm of the criterion comparative example was regarded as 100, and the common logarithm of each formulation was expressed as an index as follows. Here, the percentages of 70% and 110% each mean an elongation rate relative to the length of the original vulcanized rubber test piece sample. The larger the common logarithm index is, the less likely the crack grows, and the better the flex crack growth resistance is.

(Flex crack growth (De Mattia) index (70%, 110%))= [(Common logarithm of flexing cycle number until crack had grown 1 mm in each formulation)/(Common logarithm of flexing cycle number until crack had grown 1 mm in criterion comparative example)]×100

TABLE 1

Rubber composition for a tread

|  |  |  | Example | Comparative Examples | |
|---|---|---|---|---|---|
|  |  |  | 1 | 1 | 2 |
| Formulation (parts by mass) | Process 1 | SBR | 50 | 50 | 50 |
|  |  | BR | 30 | 30 | 30 |
|  |  | NR | 20 | 20 | 20 |
|  |  | Silica 1 | — | 75 | — |
|  |  | Silica 2 | — | — | — |
|  |  | Silica 3 | 65 | — | 65 |
|  |  | Carbon black | 5 | 5 | 5 |
|  |  | Silane coupling agent 1 | — | 6.0 | 5.2 |
|  |  | Silane coupling agent 2 | 2.6 | — | — |
|  |  | Silane coupling agent 3 | — | — | — |
|  |  | Mineral oil | 10 | 10 | 10 |
|  |  | Stearic acid | 2 | 2 | 2 |
|  |  | Anti-reversion agent | — | — | — |
|  |  | Zinc oxide | 3 | 3 | 3 |
|  |  | Age resistor | 1.5 | 1.5 | 1.5 |
|  |  | Wax | 1.5 | 1.5 | 1.5 |
|  | Process 2 | Sulfur | 1.5 | 1.5 | 1.5 |
|  |  | Vulcanization accelerator TBBS | 1.5 | 1.5 | 1.5 |
|  |  | Vulcanization accelerator DPG | 0.5 | 0.5 | 0.5 |
| Outlet temperature (° C.) |  |  | 150 | 150 | 150 |
| Test results | Breaking energy index |  | 140 | 100 | 114 |
|  | Abrasion resistance index |  | 110 | 100 | 102 |
|  | Mooney scorch time index |  | 86 | 100 | 99 |
|  | Rolling resistance index |  | 95 | 100 | 103 |
|  | Silica dispersion index |  | 101 | 100 | 90 |
|  | Wet grip performance index |  | 107 | 100 | 101 |
|  | Dry grip performance index |  | 101 | 100 | 102 |

TABLE 2

Rubber composition for a tread

|  |  |  | Examples | | Comparative Examples | | |
|---|---|---|---|---|---|---|---|
|  |  |  | 2 | 3 | 3 | 4 | 5 |
| Formulation (part(s) by mass) | Process 1 | SBR | 100 | 100 | 100 | 100 | 100 |
|  |  | BR | — | — | — | — | — |
|  |  | NR | — | — | — | — | — |
|  |  | Silica 1 | — | — | 75 | — | — |
|  |  | Silica 2 | — | — | — | — | — |
|  |  | Silica 3 | 65 | 65 | — | 65 | 65 |
|  |  | Carbon black | 5 | 5 | 5 | 5 | 5 |
|  |  | Silane coupling agent 1 | — | — | 6.0 | 5.2 | 5.2 |
|  |  | Silane coupling agent 2 | 2.6 | 2.6 | — | — | — |
|  |  | Silane coupling agent 3 | — | — | — | — | — |
|  |  | Mineral oil | 10 | 10 | 10 | 10 | 10 |
|  |  | Stearic acid | 2 | 2 | 2 | 2 | 2 |
|  |  | Anti-reversion agent | — | — | — | — | — |
|  |  | Zinc oxide | 3 | 3 | 3 | 3 | 3 |
|  |  | Age resistor | 1.5 | 1.5 | 1.5 | 1.5 | 1.5 |
|  |  | Wax | 1.5 | 1.5 | 1.5 | 1.5 | 1.5 |
|  | Process 2 | Sulfur | 1.5 | 1.5 | 1.5 | 1.5 | 1.5 |
|  |  | Vulcanization accelerator TBBS | 1.5 | 1.5 | 1.5 | 1.5 | 1.5 |
|  |  | Vulcanization accelerator DPG | 1.0 | 1.0 | 1.0 | 1.0 | 1.0 |
| Outlet temperature (° C.) |  |  | 150 | 165 | 150 | 150 | 165 |
| Test results | Breaking energy index |  | 132 | 138 | 100 | 114 | 114 |
|  | Abrasion resistance index |  | 109 | 114 | 100 | 103 | 102 |
|  | Mooney scorch time index |  | 85 | 81 | 100 | 99 | 17 |
|  | Rolling resistance index |  | 96 | 94 | 100 | 103 | 103 |
|  | Silica dispersion index |  | 100 | 105 | 100 | 90 | 94 |
|  | Wet grip performance index |  | 106 | 111 | 100 | 100 | 98 |
|  | Dry grip performance index |  | 101 | 99 | 100 | 102 | 103 |

TABLE 3

| | | | Examples | | | | | Comparative Examples | | | | | | |
|---|---|---|---|---|---|---|---|---|---|---|---|---|---|---|
| | | | 4 | 5 | 6 | 7 | 8 | 6 | 7 | 8 | 9 | 10 | 11 | 12 |
| Formulation (parts by mass) | Process 1 | SBR | — | — | — | — | — | — | — | — | — | — | — | — |
| | | BR | 60 | 60 | 60 | 60 | 60 | 60 | 60 | 60 | 60 | 60 | 60 | 60 |
| | | NR | 40 | 40 | 40 | 40 | 40 | 40 | 40 | 40 | 40 | 40 | 40 | 40 |
| | | Silica 1 | — | — | — | — | — | 75 | — | — | — | 75 | 75 | — |
| | | Silica 2 | — | — | 65 | — | — | — | — | — | 65 | — | — | — |
| | | Silica 3 | 65 | 65 | — | 65 | 65 | — | 65 | 65 | — | — | — | 65 |
| | | Carbon black | 5 | 5 | 5 | 5 | 5 | 5 | 5 | 5 | 5 | 5 | 5 | 5 |
| | | Silane coupling agent 1 | — | — | — | — | — | 6.0 | 5.2 | 5.2 | 5.2 | — | — | — |
| | | Silane coupling agent 2 | 2.6 | 2.6 | 2.6 | 2.6 | 2.6 | — | — | — | — | 3.0 | — | — |
| | | Silane coupling agent 3 | — | — | — | — | — | — | — | — | — | — | 2.3 | 2.0 |
| | | Mineral oil | 10 | 10 | 10 | 10 | 10 | 10 | 10 | 10 | 10 | 10 | 10 | 10 |
| | | Stearic acid | 2 | 2 | — | — | — | 2 | 2 | 2 | 2 | 2 | 2 | 2 |
| | | Anti-reversion agent | — | — | 3 | 3 | 3 | — | — | — | — | — | — | 3 |
| | | Zinc oxide | 3 | 3 | 3 | 3 | 3 | 3 | 3 | 3 | 3 | 3 | 3 | 3 |
| | | Age resistor | 1.5 | 1.5 | 1.5 | 1.5 | 1.5 | 1.5 | 1.5 | 1.5 | 1.5 | 1.5 | 1.5 | 1.5 |
| | | Wax | 1.5 | 1.5 | 1.5 | 1.5 | 1.5 | 1.5 | 1.5 | 1.5 | 1.5 | 1.5 | 1.5 | 1.5 |
| | Process 2 | Sulfur | 1.5 | 1.5 | 1.5 | 1.5 | 1.5 | 1.5 | 1.5 | 1.5 | 1.5 | 1.5 | 1.5 | 1.5 |
| | | Vulcanization accelerator TBBS | 1.5 | 1.5 | 1.5 | 1.5 | 1.5 | 1.5 | 1.5 | 1.5 | 1.5 | 1.5 | 1.5 | 1.5 |
| | | Vulcanization accelerator DPG | — | — | — | — | — | — | — | — | — | — | — | — |
| Outlet temperature (° C.) | | | 150 | 165 | 150 | 150 | 150 | 150 | 150 | 165 | 150 | 150 | 150 | 150 |
| Test results | | Breaking energy index | 150 | 154 | 118 | 139 | 133 | 100 | 117 | 117 | 93 | 112 | 97 | 117 |
| | | Abrasion resistance index | 112 | 116 | 104 | 111 | 107 | 100 | 103 | 102 | 91 | 102 | 96 | 105 |
| | | Mooney scorch time index | 88 | 85 | 102 | 124 | 127 | 100 | 99 | 19 | 101 | 67 | 19 | 65 |
| | | Rolling resistance index | 93 | 100 | 101 | 98 | 102 | 100 | 102 | 110 | 108 | 95 | 98 | 98 |
| | | Silica dispersion index | 103 | 105 | 98 | 108 | 105 | 100 | 89 | 93 | 84 | 106 | 102 | 102 |
| | | Wet grip performance index | 112 | 113 | 104 | 106 | 105 | 100 | 102 | 100 | 95 | 103 | 99 | 105 |
| | | Dry grip performance index | 102 | 99 | 103 | 106 | 107 | 100 | 102 | 103 | 103 | 100 | 101 | 102 |

In Comparative Examples 1, 3, and 6, silica (silica 1) that was not finely-divided silica according to the present invention, and a silane coupling agent (silane coupling agent 1) free from a mercapto group were used. Accordingly, the breaking energy indices and abrasion resistance of these Comparative Examples were inferior to those of Examples.

In Comparative Examples 2, 4, 5, 7, and 8, finely-divided silica (silica 3) was used, but a specific mercapto group-containing silane coupling agent (silane coupling agent 2) was not used. Accordingly, in these Comparative Examples, the silica was poorly dispersed, the breaking energy indices and abrasion resistance were equal to or lower than those of Examples, and the wet grip performance was inferior to that of Examples.

In Comparative Example 9, finely-divided silica (silica 2) different from those in Comparative Examples 2, 4, 5, 7, and 8 was used, but a specific mercapto group-containing silane coupling agent (silane coupling agent 2) was not used. Accordingly, the silica was very poorly dispersed, and the breaking energy index, abrasion resistance, and wet grip performance of Comparative Example 9 were considerably inferior.

In Comparative Example 10, silica (silica 1) that was not finely-divided silica according to the present invention, and a specific mercapto group-containing silane coupling agent (silane coupling agent 2) were used. Accordingly, the scorch time was short. In addition, since finely-divided silica (silica 2 or 3) according to the present invention was not used, the breaking energy index and abrasion resistance of Comparative Example 10 were inferior to those of Examples.

In Comparative Example 11, silica (silica 1) that was not finely-divided silica according to the present invention, and a mercapto group-containing silane coupling agent (silane coupling agent 3) different from a specific mercapto group-containing silane coupling agent were used. Accordingly, the scorch time was very short and processing was difficult by usual methods. In addition, the breaking energy index, abrasion resistance, and wet grip performance of Comparative Example 11 were inferior.

In Comparative Example 12, finely-divided silica (silica 3) was used, but a mercapto group-containing silane coupling agent (silane coupling agent 3) different from a specific mercapto group-containing silane coupling agent was used. Accordingly, the scorch time of Comparative Example 12 was shorter than that of Examples. In addition, the breaking energy was equal to or lower than that of Examples.

In Examples, on the other hand, the abrasion resistance and breaking energy indices were good, and very good particularly in Examples 1, 4, and 5 with use of silica 3. The breaking energy indices and abrasion resistance of Examples 4 and 5 in which the rubber composition contained high proportions of NR and BR (did not contain SBR) were better than those of Examples 2 and 3 in which the rubber composition contained only SBR as a rubber component, and Example 1 in which the rubber composition contained SBR, NR and BR as a rubber component.

The silica dispersibility was good or comparatively good in Examples, and particularly good in Examples 7 and 8 with use of an anti-reversion agent and finely-divided silica (silica 3).

The wet grip performance and dry grip performance of Examples were all good, and equal to or higher than those of the criterion comparative examples, Comparative Examples 1, 3, and 6.

The breaking energy index and abrasion resistance were particularly improved in Examples 3 and 5 in which a specific mercapto group-containing silane coupling agent (silane coupling agent 2 (NXT-Z)) was used and the outlet temperature in Process 1 was increased (high-temperature kneading was performed). In these Examples, scorch time was not so decreased, and no problem of processability occurred. In Example 3 in which the amount of SBR in 100% by mass of a rubber component was 100% by mass, high-temperature kneading made rolling resistance far better.

On the other hand, in Comparative Examples 5 and 8 in which a silane coupling agent (silane coupling agent 1) free from a mercapto group was used and high-temperature kneading was performed, scorch time was very short, and the rubber compositions tended to scorch.

The results of Example 4 were compared with those of Comparative Example 6 (with use of common silica and a common silane coupling agent), Comparative Example 7 (with use of finely-divided silica and a common silane coupling agent), and Comparative Example 10 (with use of common silica and a specific mercapto group-containing silane coupling agent). In this comparison, in Example 4, breaking energy, abrasion resistance, rolling resistance, and wet grip performance were synergistically improved, and good dry grip performance was achieved.

TABLE 4

Rubber composition for a sidewall and a base tread

|  |  |  | Examples | | | | | | |
|---|---|---|---|---|---|---|---|---|---|
|  |  |  | 9 | 10 | 11 | 12 | 13 | 14 | 15 |
| Formulation (part(s) by mass) | Process 1 | BR | 60 | 60 | 60 | 60 | 60 | 70 | 40 |
| | | NR | 40 | 40 | 40 | 40 | 40 | 30 | 60 |
| | | Silica 1 | — | — | — | — | — | — | — |
| | | Silica 2 | — | — | 30 | — | — | — | — |
| | | Silica 3 | 30 | 30 | — | 30 | 30 | 30 | 30 |
| | | Silane coupling agent 1 | — | — | — | — | — | — | — |
| | | Silane coupling agent 2 | 1.2 | 1.2 | 1.2 | 1.2 | 1.2 | 1.2 | 1.2 |
| | | Silane coupling agent 3 | — | — | — | — | — | — | — |
| | | Mineral oil | 5 | 5 | 5 | 5 | 5 | 5 | 5 |
| | | Stearic acid | 2 | 2 | — | — | 2 | — | 2 |
| | | Anti-reversion agent | — | — | 3 | 3 | 3 | 3 | 3 |
| | | Zinc oxide | 3 | 3 | 3 | 3 | 3 | 3 | 3 |
| | | Age resistor | 1.5 | 1.5 | 1.5 | 1.5 | 1.5 | 1.5 | 1.5 |
| | | Wax | 1.5 | 1.5 | 1.5 | 1.5 | 1.5 | 1.5 | 1.5 |
| | Process 2 | Sulfur | 1.6 | 1.6 | 1.6 | 1.6 | 1.6 | 1.6 | 1.6 |
| | | Vulcanization accelerator TBBS | 1.0 | 1.0 | 1.0 | 1.0 | 1.0 | 1.0 | 1.0 |
| Outlet temperature (° C.) | | | 150 | 165 | 150 | 150 | 150 | 150 | 150 |
| Test results | Breaking energy index | | 125 | 127 | 110 | 122 | 115 | 109 | 119 |
| | Tear strength index | | 127 | 131 | 116 | 121 | 112 | 107 | 112 |
| | Mooney scorch time index | | 90 | 88 | 95 | 111 | 114 | 100 | 99 |
| | Rolling resistance index | | 95 | 101 | 102 | 99 | 101 | 93 | 103 |
| | Silica dispersion index | | 102 | 106 | 99 | 107 | 104 | 100 | 96 |
| | Flex crack growth (De Mattia) index (70%) | | 100 | 103 | 97 | 100 | 100 | 103 | 97 |
| | Flex crack growth (De Mattia) index (110%) | | 100 | 102 | 97 | 100 | 100 | 102 | 97 |

|  |  |  | Comparative Examples | | | | | | | | |
|---|---|---|---|---|---|---|---|---|---|---|---|
|  |  |  | 13 | 14 | 15 | 16 | 17 | 18 | 19 | 20 | 21 |
| Formulation (part(s) by mass) | Process 1 | BR | 60 | 60 | 60 | 60 | 60 | 60 | 70 | 40 | 60 |
| | | NR | 40 | 40 | 40 | 40 | 40 | 40 | 30 | 60 | 40 |
| | | Silica 1 | 35 | — | — | — | 35 | 35 | 35 | 35 | — |
| | | Silica 2 | — | — | — | 30 | — | — | — | — | — |
| | | Silica 3 | — | 30 | 30 | — | — | — | — | — | 30 |
| | | Silane coupling agent 1 | 2.8 | 2.4 | 2.4 | 2.4 | — | — | 2.8 | 2.8 | — |
| | | Silane coupling agent 2 | — | — | — | — | 1.4 | — | — | — | — |
| | | Silane coupling agent 3 | — | — | — | — | — | 1.1 | — | — | 0.9 |
| | | Mineral oil | 5 | 5 | 5 | 5 | 5 | 5 | 5 | 5 | 5 |
| | | Stearic acid | 2 | 2 | 2 | 2 | 2 | 2 | 2 | 2 | 2 |
| | | Anti-reversion agent | — | — | — | — | — | — | — | — | 3 |
| | | Zinc oxide | 3 | 3 | 3 | 3 | 3 | 3 | 3 | 3 | 3 |
| | | Age resistor | 1.5 | 1.5 | 1.5 | 1.5 | 1.5 | 1.5 | 1.5 | 1.5 | 1.5 |
| | | Wax | 1.5 | 1.5 | 1.5 | 1.5 | 1.5 | 1.5 | 1.5 | 1.5 | 1.5 |
| | Process 2 | Sulfur | 1.6 | 1.6 | 1.6 | 1.6 | 1.6 | 1.6 | 1.6 | 1.6 | 1.6 |
| | | Vulcanization accelerator TBBS | 1.0 | 1.0 | 1.0 | 1.0 | 1.0 | 1.0 | 1.0 | 1.0 | 1.0 |
| Outlet temperature (° C.) | | | 150 | 150 | 165 | 150 | 150 | 150 | 150 | 150 | 150 |
| Test results | Breaking energy index | | 100 | 107 | 109 | 95 | 107 | 107 | 90 | 107 | 108 |
| | Tear strength index | | 100 | 105 | 107 | 98 | 104 | 104 | 93 | 105 | 108 |
| | Mooney scorch time index | | 100 | 99 | 96 | 101 | 68 | 20 | 105 | 95 | 68 |
| | Rolling resistance index | | 100 | 101 | 108 | 107 | 96 | 99 | 95 | 106 | 96 |
| | Silica dispersion index | | 100 | 90 | 93 | 85 | 105 | 101 | 95 | 101 | 101 |
| | Flex crack growth (De Mattia) index (70%) | | 100 | 96 | 97 | 92 | 100 | 97 | 103 | 96 | 96 |
| | Flex crack growth (De Mattia) index (110%) | | 100 | 95 | 97 | 91 | 100 | 97 | 102 | 95 | 96 |

In Comparative Example 13, silica that was not finely-divided silica, and a coupling agent free from a mercapto group were used. Accordingly, the breaking energy and tear strength of Comparative Example 13 were inferior to those of Examples. In Comparative Example 14, finely-divided silica excellent in dispersibility was used, but a mercapto group-containing coupling agent was not used. Accordingly, the silica was poorly dispersed, and the breaking energy and tear strength of Comparative Example 14 were inferior, to those of Examples. In addition, the flex crack growth resistance of Comparative Example 14 was equal to or lower than that of Examples. In Comparative Example 15, the outlet temperature upon kneading silica was higher than that of Comparative Example 14 with the same formulation. Thereby, the silica dispersibility was slightly improved, and breaking energy, tear strength, and flex crack growth resistance were somewhat improved in Comparative Example 15. However, since the coupling agent of Comparative Example 15 was not a mercapto group-containing coupling agent, these improvements in Comparative Example 15 were small, and the levels of these performances were still equal to or lower than those of Examples. In addition, the high-temperature kneading in Comparative Example 15 further worsened the rolling resistance index that was bad in Comparative Example 14.

In Comparative Example 16, finely-divided silica was used, but a mercapto-group containing coupling agent was not used. Accordingly, the silica was very poorly dispersed, and the breaking energy, tear strength, rolling resistance, and flex crack growth resistance of Comparative Example 16 were considerably inferior. In Comparative Example 17, common silica, which was not finely-divided silica, and a specific mercapto group-containing coupling agent were used, and therefore scorch time was short. In addition, since finely-divided silica was not used in Comparative Example 17, the breaking energy and tear strength were inferior to those of Examples. In Comparative Example 18, common silica, which was not finely-divided silica, and a mercapto group-containing coupling agent different from that used in Comparative Example 17 were used. Accordingly, the scorch time was very short and processing was difficult by usual methods. In addition, in Comparative Example 18, the breaking energy and tear strength were inferior to those of Examples, and the flex crack growth resistance was equal to or lower than that of Examples.

The NR/BR ratio of Comparative Examples 19 and 20 corresponded to that of Examples 14 and 15, respectively, and silica that was not finely-divided silica, and a coupling agent free from a mercapto group were used in Comparative Examples 19 and 20. In Comparative Example 19, the BR was particularly increased, and thereby breaking energy and tear strength were considerably deteriorated. In Comparative Example 20, the breaking energy and tear strength were slightly improved but still inferior to those of Examples, and the rolling resistance and flex crack growth resistance were considerably deteriorated and inferior to those of Examples.

In Comparative Example 21, finely-divided silica was used as silica, but a mercapto group-containing coupling agent that did not have the structure specified in the present invention was used. Accordingly, the scorch time was short. In addition, in Comparative Example 21, the flex crack growth resistance was equal to or lower than that of Examples, and the breaking energy was slightly lower than that of Examples.

On the other hand, the tear strength and breaking energy indices of Examples were good, and breaking energy and tear strength were good particularly in Examples 9 and 10. Especially in Example 10 in which the outlet temperature upon kneading silica was increased, since the silica dispersibility was further improved, these performances were very good, and flex crack growth resistance was also improved. The silica dispersibility was good or comparatively good in Examples, and good in Examples 11 to 15 with use of an anti-reversion agent and finely-divided silica excellent in dispersibility, and particularly good in Examples 12 and 13. In addition, the flex crack growth resistance of Examples was better than that of the corresponding Comparative Examples.

The results of Example 9 were compared with those of Comparative Example 13 (with use of common silica and a common silane coupling agent), Comparative Example 14 (with use of finely-divided silica and a common silane coupling agent), and Comparative Example 17 (with use of common silica and a specific mercapto group-containing silane coupling agent). In this comparison, in Example 9, breaking energy, tear strength, and rolling resistance were synergistically improved, and flex crack growth resistance was good.

The invention claimed is:

1. A tire rubber composition, comprising:
a rubber component;
silica; and
a silane coupling agent,
wherein said silica has a CTAB specific surface area of 195 m²/g or more and a BET specific surface area of 200 m²/g or more, and
said silane coupling agent is a copolymer comprising units A represented by formula (1) and units B represented by formula (2), and the proportion of the units B is 30 to 60 mol % of the total molar amount of the units A and the units B:

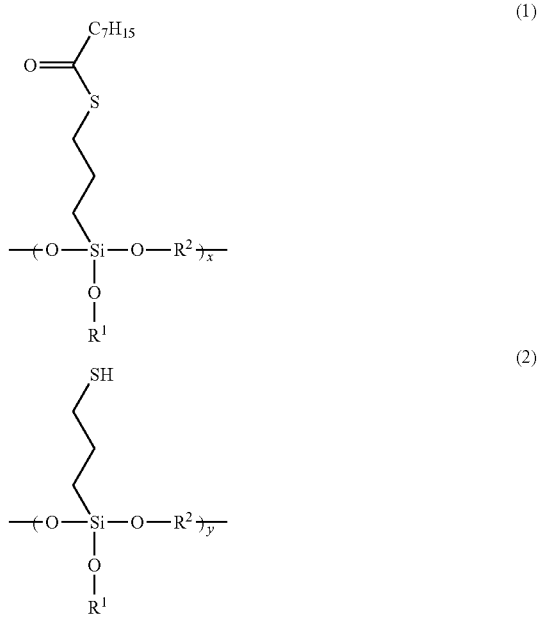

wherein x and y each are an integer of one or more,
R¹ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group in which a hydrogen atom at the end of the alkyl or alkenyl group is replaced with a hydroxy or carboxyl group,
R² represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^1$ and $R^2$ may form a ring structure together, wherein the amount of silica is 5 to 150 parts by mass per 100 parts by mass of the rubber component, and the amount of the silane coupling agent is 0.5 to 20 parts by mass per 100 parts by mass of the silica.

2. The tire rubber composition according to claim 1, wherein said silica has an aggregate size of 30 nm or more.

3. The tire rubber composition according to claim 1, wherein the tire rubber composition comprises 30% by mass or more of a butadiene rubber based on 100% by mass of said rubber component.

4. The tire rubber composition according to claim 1, wherein the tire rubber composition comprises 5 to 60% by mass of a natural rubber based on 100% by mass of the rubber component.

5. The tire rubber composition according to claim 1, wherein the tire rubber composition comprises 5 to 60% by mass of a natural rubber based on 100% by mass of the rubber component, and 5 to 85% by mass of a butadiene rubber based on 100% by mass of the rubber component.

6. The tire rubber composition according to claim 1, wherein the tire rubber composition comprises 15 to 65% by mass of a natural rubber based on 100% by mass of the rubber component, and 30 to 85% by mass of a butadiene rubber based on 100% by mass of the rubber component.

7. The tire rubber composition according to claim 1, wherein the CTAB specific surface area is 195 to 300 m$^2$/g and the BET specific surface area is 200 to 300 m$^2$/g.

8. The tire rubber composition according to claim 1, wherein the aggregate size of the silica is 45 nm or more.

9. The tire rubber composition according to claim 1, which further contains a mixture of a zinc salt of an aliphatic carboxylic acid and a zinc salt of an aromatic carboxylic acid, and/or a zinc salt of $C_{4-16}$ aliphatic carboxylic acid, wherein the total amount of the mixture and the zinc salt of a $C_{4-16}$ aliphatic carboxylic acid is 0.2 to 10 parts by mass based on 100 parts by mass of the rubber component.

10. The tire rubber composition according to claim 1, which further contains a carbon black with the nitrogen adsorption specific surface area of 70 to 200 m$^2$/g, and the amount of the carbon black is 1 to 100 parts by mass based on 100 parts by mass of the rubber component.

11. The tire rubber composition according to claim 1, wherein the CTAB specific surface area is 195 to 250 m$^2$/g and the BET specific surface area is 200 to 260 m$^2$/g, the amount of the silica is 20 to 80 parts by mass per 100 parts by mass of the rubber component, and the amount of the silane coupling agent is 0.5 to 10 parts by mass per 100 parts by mass of the silica.

12. A pneumatic tire having a tread, a sidewall, or a base tread that is made from the tire rubber composition according to claim 1.

13. A pneumatic tire made from the rubber composition according to claim 1.

14. A pneumatic tire having a tread made from the tire rubber composition according to claim 5.

15. A pneumatic tire having a sidewall or a base tread made from the tire rubber composition according to claim 6.

* * * * *